United States Patent
Spahr et al.

(10) Patent No.: US 7,658,452 B2
(45) Date of Patent: *Feb. 9, 2010

(54) HUB AND WHEEL, IN PARTICULAR FOR BICYCLES

(75) Inventors: Stefan Spahr, Lengau (CH); Martin Walthert, Bern (CH); Andreas Reuteler, Biel/Bienne (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/897,519

(22) Filed: Aug. 30, 2007

(65) Prior Publication Data

US 2008/0054709 A1 Mar. 6, 2008

(30) Foreign Application Priority Data

Aug. 31, 2006 (DE) .................... 10 2006 040 919

(51) Int. Cl.
*B60B 27/02* (2006.01)
*B60B 1/04* (2006.01)
*B60B 21/06* (2006.01)

(52) U.S. Cl. ............... 301/110.5; 301/58; 301/59; 301/61

(58) Field of Classification Search ............ 301/55, 301/56, 58, 59, 61, 74, 75, 80, 81, 104, 110.5, 301/110.6; 411/383, 392

See application file for complete search history.

(56) References Cited

U.S. PATENT DOCUMENTS

| | | | | |
|---|---|---|---|---|
| 258,474 A | * | 5/1882 | Rembert | 301/70 |
| 380,358 A | * | 4/1888 | Smith et al. | 301/59 |
| 623,409 A | * | 4/1899 | Ludlow | 301/6.5 |
| 689,371 A | * | 12/1901 | Stutsman | 301/60 |
| 879,584 A | * | 2/1908 | Preston | 301/81 |
| 2,246,492 A | * | 6/1941 | Aldridge | 301/110.5 |
| 2,274,899 A | * | 3/1942 | Johnson | 411/411 |
| 2,937,905 A | * | 5/1960 | Altenburger | 301/58 |
| 4,844,552 A | * | 7/1989 | Tsygankov et al. | 301/64.702 |
| 5,829,844 A | * | 11/1998 | Slankard et al. | 301/110.5 |
| 7,320,570 B2 | * | 1/2008 | Czarnek | 411/393 |
| 2001/0054840 A1 | * | 12/2001 | Schlanger | 301/59 |

FOREIGN PATENT DOCUMENTS

| DE | 943506 U1 | * | 6/1994 |
|---|---|---|---|
| EP | 0853007 B1 | * | 9/2003 |

* cited by examiner

*Primary Examiner*—S. Joseph Morano
*Assistant Examiner*—Kip T Kotter
(74) *Attorney, Agent, or Firm*—Greer, Burns & Crain, Ltd.

(57) ABSTRACT

A hub and a wheel equipped with such a hub for bicycles, wherein the hub includes a fixed hub axle and a hub body rotatably mounted relative to fixed hub axle through two bearings. The hub body includes a hub sleeve and two separate hub flanges positioned on the hub sleeve at which spokes are disposed to connect the hub body with a rim. The hub flanges are fastened to the hub sleeve by connecting members positioned substantially perpendicular to the hub axle.

19 Claims, 7 Drawing Sheets

Fig. 17

HUB AND WHEEL, IN PARTICULAR FOR BICYCLES

BACKGROUND

The invention relates to a hub and a wheel, in particular for bicycles, and a bicycle equipped with these. The invention may be used for both front wheels and rear wheels where as a rule one or more sprockets may be disposed.

In the field of amateurs and in particular in professional cycling, the stress tolerance, weight and ease of maintenance of components are a decisive factor since the users value high-quality, lightweight, and easily maintained components. Users furthermore desire that in the case that one part of a component is defective, it should not be necessary to replace an entire component, but that in the scope of regular maintenance or if a defect occurs, particular parts can be replaced separately.

As a rule a bicycle hub consists of a hub body rotatably mounted around a hub axle comprising a hub sleeve and two hub flanges integrally formed thereon, which are provided with holes to receive the spokes which connect the hub with the rim. In the interior of the hub sleeve, at least two bearings are provided to rotatably support the hub body relative to the hub axle. The exterior bearing bushing is most often formed in the hub sleeve while the inner bearing ring or interior bearing bushing is formed on the hub axle. It is also conceivable that a separate outer bearing ring is in connection with the hub sleeve while a separate inner bearing ring is in connection with the hub axle. In such a known hub the hub flanges are strained through the spoke tension forces acting on the hub flanges and directed radially outwardly. The strain, which is dependent on the load, concurrently influences the bearing play such that changes in the spoke tension cause the operating conditions of the bearing to change. This interrelationship may lead to a reduced operating strength of the hub.

It is another drawback of this known hub that in the case that the hub flange breaks e.g. due to overload, the entire hub must be replaced. One possibility of solving this problem is offered by a hub consisting of multiple parts.

DE 94 03 506 U1 discloses a multipart hub for a bicycle where the spoke-carrying flanges are placed in a center piece and a particular link geometry is used, in particular a polygon profile. In the interior of the spoke-carrying flanges the bearings to support the hub body relative to the hub axle are provided. In this hub the radial load on the spokes also causes a strain on the hub flanges and thus a strain on the bearing seats which may adversely affect the durability of the bearings.

U.S. Pat. No. 5,829,844 discloses a hub for a bicycle where separate hub flanges are provided at the hub body to receive the spokes. The hub flanges are placed on the hub body over the hub axle ends with a kind of inner toothing at the hub flanges interacting with a kind of outer toothing at the hub body to achieve that the hub flanges are non-rotatably accommodated at the hub body. Washers and separate screws are then used to secure the hub flanges by way of the laterally applied pressure.

The drawback of this hub known in the prior art is that the washers and the large screws for fastening the hub flanges to the hub body provide additional weight. Furthermore, manufacturing the hub requires extensive work due to the required outer profile at the hub body.

EP 0 853 007 B1 discloses a flanged bicycle hub where the hub flanges for receiving the spokes are not formed integrally with the hub sleeve but are provided as separate parts. In this hub the hub flanges are pushed onto provided portions of the hub body for mounting until the hub flanges snugly fit at corresponding steps on the hub body. By screwing on fastening caps the hub flanges are axially clamped, thus being secured against slipping off.

This hub known from the prior art allows to remove the fastening caps by unscrewing and thus to replace the hub flanges of the hub so as to allow replacement of e.g. defective hub flanges. In this hub the bearings between the hub body and the hub axle are not under load from the radial spoke tension since the hub flanges are provided separately.

It is a drawback of this hub though that for one, the hub body requires a considerable radial thickness to allow the axial hub flange stops to be formed thereat. It is another drawback that large, axially screwed-on fastening caps are required for securing the hub flanges, which increases the error susceptibility and also the total weight of the hub. It is another drawback that toothings are provided on the inner periphery of the hub flange and on the outer periphery of the hub body which require extensive manufacturing steps, thus increasing the price.

In view of the indicated prior art it is the object of the present invention to provide a hub and a wheel in particular for bicycles wherein a modular structure allows replacement of individual parts. Another aspect of the object is to provide a lightweight hub.

SUMMARY

A hub according to the invention is in particular suitable to be used with bicycles, comprising a fixed hub axle and a hub body rotatably supported relative to the fixed hub axle through in particular at least one and preferably at least two bearings. The hub body comprises a hub sleeve and two separate hub flanges positioned on the hub sleeve where spokes can be disposed to connect the hub body with a rim. According to the invention the hub flanges are fastened to the hub sleeve by connecting members positioned substantially perpendicular or transverse to the hub axle.

The invention offers many advantages. Differently from the known prior art, the hub flanges are not laterally clamped on the hub sleeve by axially orientated fastening elements which extend around the entire periphery of the hub axle but by employing fastening elements which are substantially orientated in a plane perpendicular or transverse relative to the extension of the hub axle. In this way the structure of the hub may be facilitated while concurrently allowing particular ease of maintenance since the structure is especially simple. Also, the number of parts employed may be reduced.

The wheel according to the invention is in particular provided to be used with a bicycle, comprising a rim and a hub with a fixed hub axle, around which a hub body is rotatably disposed. A plurality of spokes positioned between the hub body and the rim is provided so as to non-rotatably connect the rim with the hub body. The hub body is supported to be rotatable relative to the fixed hub axle in particular via at least one and preferably via at least two bearings. The hub sleeve comprises at least two hub flanges disposed on the hub sleeve at which the spokes to connect the hub body with the rim are provided. According to the invention the hub flanges are fastened to the hub sleeve by connecting members positioned substantially perpendicular and/or transverse to the hub axle.

The wheel according to the invention also offers considerable advantages since a use of connecting members positioned substantially perpendicular to the hub axle allows an easy-maintenance wheel which is simple in structure and low in weight and which also may include a relatively small number of parts.

In preferred specific embodiments according to the invention the connecting members between the hub flanges and the hub sleeve are orientated in particular substantially radially to thus enable a favorable force transmission.

In a preferred specific embodiment of the invention the connecting members connect the hub flanges with the hub sleeve both non-rotatably and in the axial direction fixedly such that by way of the connecting members the hub flanges are secured against rotation and against axial displacement relative to the hub sleeve or the hub body.

In an advantageous specific embodiment of the invention, at least one connecting member is configured as a screw part or comprises at least one screw part. Screw parts offer the advantage of being received loss-proof.

In a preferred specific embodiment of the invention at least one connecting member comprises an external thread which can be or is screwed into an internal thread in the hub flange to connect the hub flange with the hub sleeve.

To secure the screwed connection, an adhesive may be provided in the threaded portion disposed in the hub flange which may be activated in particular by screwing in a connecting member configured as a screw part. The adhesive may comprise two or more different components which are activated by screwing, such that after the screwing step the glue hardens, ensuring a firm though removable seat of the connecting member in the hub sleeve.

In preferred specific embodiments of the invention at least one screw part comprises a screw head, a screw body, and a pin part, which pin part is in particular provided as a separate part and is accommodated loss-proof at the screw part. The pin part may be glued, screwed, or clamped in the screw part or attached in any other way. The screw part may entirely be configured as a pin part or be integrally formed with it.

In all of the configurations the connecting member may provide an end stop e.g. by way of the screw head being enlarged in diameter such that an end stop is provided. This is to prevent that the connecting member or the pin part presses on the bearing seat inside the hub sleeve, thus impeding the bearing properties.

In further configurations the connecting member may be inserted and in particular screwed into the hub flange thus far so as to allow a hub nipple to be positioned radially outwardly. By way of a step disposed in the hub flange an end stop may be realized and radially further outwardly there can still be provided the hub nipple to receive a spoke.

The screw head and the screw body consist in particular of a lightweight metallic material, preferably of a light metal, and the pin part consists in particular of metal and preferably of steel. Since in particular the pin part assumes transmission of the occurring forces it must be designed and configured to be correspondingly robust. The pin part surface may be hardened.

The pin part is preferably provided centered on the screw part, protruding at the end of the screw body opposite the screw head, such that the pin part projects beyond one end of the screw body. This allows a configuration such that if it is installed as provided, only the pin part of the connecting member or of the screw part extends from the hub flange into the hub sleeve from radially outwardly to thus cause a non-rotatable connection between hub flange and hub sleeve.

The opening provided in the hub sleeve for receiving the pin part is in particular matched to the outer dimensions of the pin part to allow at least a substantially play-free connection in a floating fit preferably in the radial direction.

In such a configuration where the pin part extends into the hub sleeve from outside it is very advantageous for the pin part to consist of a firm, durable material such as steel.

Preferably the pin part comprises a smooth surface and a cross-section of the pin part is taken from a group of cross-sections comprising round, triangular, square and multiangular or polygonal cross-sections and rounded off modifications of the cross-sections indicated, and star-shaped cross-sections and the like.

The pin part may be configured straight throughout its length and preferably it is cylindrical but it may be slightly tapered toward the front tip.

A pin part comprising a smooth surface and being e.g. round in cross-section and cylindrical in shape, offers considerable advantages since inserting the pin part into the corresponding opening or bore in the hub sleeve allows a non-rotatable and a firm and substantially play-free connection also in the axial direction between the hub flange and the hub sleeve while on the other hand, in the radial direction, movement of the hub flange relative to the hub sleeve is possible, such that the radially acting spoke tension has no effect on the bearing positioned inside the hub sleeve between the hub sleeve and the hub axle.

Preferably, two, three, four, five, six or more connecting members are employed all of which are preferably configured as screw parts.

Preferably the connecting members are positioned at substantially equal angular distances over the periphery of the hub flanges, wherein if multiple connecting members are employed, the load is distributed between the individual connecting members.

Although the orientation of the connecting members may be provided in the radial direction if installed as provided, it is conceivable for the orientation of the connecting members to be at an angle relative to the radial direction where in all the cases they are positioned within or substantially within a plane perpendicular or nearly transverse to the hub axle.

Preferably the inventive hub and also the inventive wheel are modular in structure such that in the case of defects, single parts of the individual components may be replaced. For example if a flange of the hub breaks, a hub flange may be replaced individually. If a defect occurs in a hub sleeve, it may even be possible to replace the hub sleeve while the spokes remain in place without requiring extensive disassembly.

In advantageous specific embodiments of the invention the hub flanges comprise means for receiving the spokes e.g. configured as holes for the spoke heads to bear against.

Preferably, however, the hub flanges comprise threaded holes for means to receive the spokes to be positioned. The means to receive the spokes are preferably configured as hub nipples comprising an external thread for screwing into the threaded holes of the hub flanges and comprising an internal bore with an internal thread for an end thread of a spoke to be screwed in.

Particularly preferred configurations of the invention provide for the hub nipples and the threaded holes to be substantially positioned in a plane perpendicular or approximately transverse to the hub axle which axle of the hub nipples may be slightly inclined relative to the plane perpendicular to the hub axle e.g. approximately 3° or approximately 5°.

Advantageous configurations provide for the inventive hub to be configured as a rear wheel hub where at least one sprocket may be positioned. In this case the hub preferably comprises a rotor for receiving a sprocket assembly of multiple sprockets. Said rotor is preferably supported by at least one or two bearings to be rotatable relative to the hub axle.

In preferred configurations the rotor comprises driver cams positioned on the outer surface to non-rotatably receive the sprockets which driver cams comprise axial notches to in particular reduce the rotor weight. The axially positioned notches in the driver cams may be configured as axial grooves, gaps or slots or the like. This allows to achieve a reduced weight of the rotor and thus the entire hub since the driver cams are not configured solid.

In a preferred specific embodiment of the invention the rotor comprises axial holes distributed over the periphery which are in particular configured as bores to still further reduce the weight of the rotor. Further embodiments may provide for the rotor and/or the hub sleeve structure to be honeycombed.

Should the hub be provided with a receiving space to receive a sprocket or a rotor, a freewheel is preferably provided to allow the rotor to freely rotate relative to the hub in one rotational direction. A freewheel is preferably configured as a toothed disc freewheel, comprising two toothed discs in particular in a floating fit which are externally pressed onto one another by means of suitable springs or the like.

In the inventive wheel at least one connecting member is screwed into the hub flange wherein the connecting member may also be screwed into the hub sleeve to secure the connection of the hub flange and the hub sleeve. However, preferably it is not the thread but only the pin part which extends into the hub sleeve from the outside which pin part at least in this portion does not comprise an external thread but a smooth surface because this allows, by means of a matched bore in the hub sleeve, to ensure a non-rotatable and axially secure connection between the hub flange and the hub sleeve.

In the wheel according to the invention, spoke nipples are preferably used which are positioned entirely within the hollow rim such that only the spokes and the rim are visible from outside.

In the wheel according to the invention the rim comprises a radially outwardly rim well and radially further inwardly, a rim base provided with spoke holes, said rim well and said rim base being laterally connected in the radial direction by means of two rim flanks. The rim base is provided with spoke holes wherein each spoke hole is preferably provided with a separate holding member which in a tilted position can be inserted through the spoke hole together with a spoke nipple received at the holding member, while in a reclined position it contacts the rim in which it is received to be tension-proof in the radially inwardly direction so as to fix the spoke to the rim. The spoke holes in particular are elongated in shape or are configured elongated, extending so as to be longer in the peripheral direction of the wheel than in the axial direction. The holding member and the spoke nipple are configured so as to allow an angularly variable orientation of the spoke relative to the rim. To this end the nipple head is configured rounded, and it is received in a nipple head seat of the holding member which is configured rounded. The holding member is in particular configured as a nipple support.

Such a configuration offers considerable advantages. This preferred design provides a wheel which allows a lightweight structure. The holding member allows a distribution of the acting forces over a considerably larger surface such that the wall thickness as a whole of the rim base can be reduced. In this way the sturdiness of the wheel is retained while the total weight is reduced.

The design of the holding member with a rounded shape of the nipple head seat and the rounded shape of the nipple head allows a transmission of large forces while at the same time allowing an optimal orientation of the spoke nipple and the spoke positioned therein. The spoke nipple and thus the spoke itself can be optimally orientated in their angles so as to largely avoid harmful transverse forces, bending and buckling stresses acting on the spoke. In this way the causes for most spoke breakages is eliminated while providing a spoke wheel having a hollow rim in which the structure does not require any openings in the rim well for inserting the spoke nipples through the rim well from outside.

To affix the spokes to the spoke nipples bearing against the rim and/or to affix the spokes to the hub nipples provided at the hub, an adhesive may be provided in the spoke nipples and/or the hub nipples in the corresponding threaded portion which can in particular be activated by screwing in the spokes. The adhesive may comprise two or more different components which are activated by screwing, such that after the screwing step the glue hardens, ensuring a firm though removable seat of the spoke.

BRIEF DESCRIPTION OF THE DRAWINGS

Further advantages and features can be taken from the exemplary embodiments described below with reference to the enclosed Figures.

The Figures show in.

DETAILED DESCRIPTION

Figure 1:
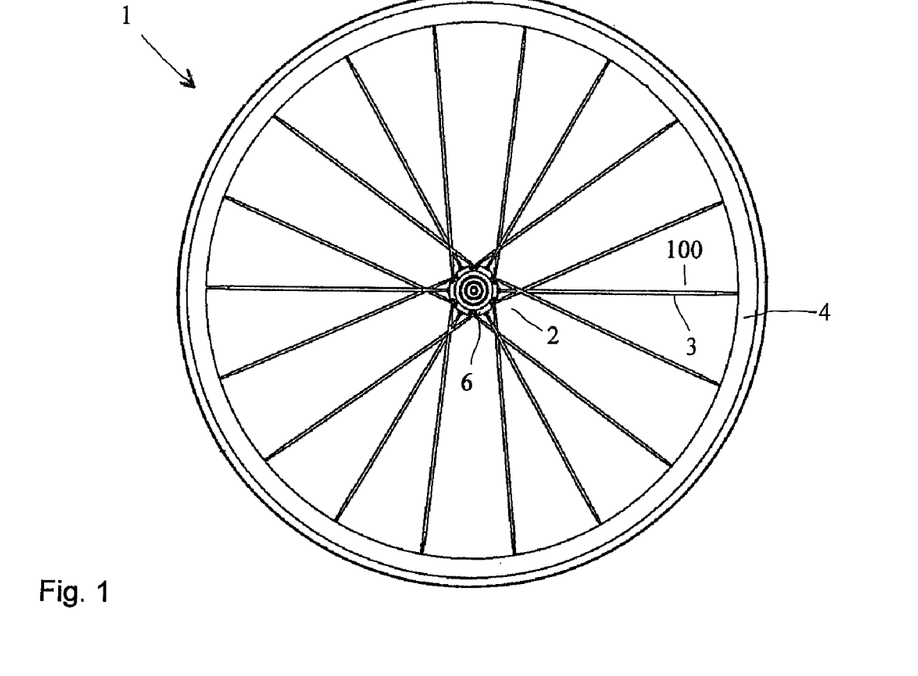
FIG. 1 an inventive front wheel in a side view.
Figure 2:
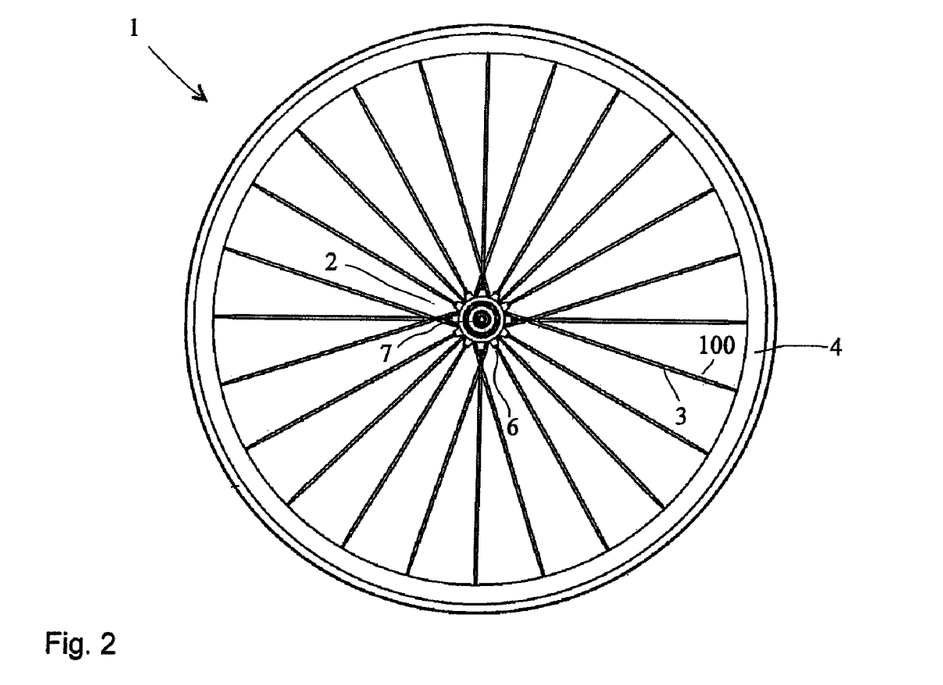
FIG. 2 an inventive rear wheel in a side view.

FIGS. 1 and 2 illustrate two inventive wheels with different spoke arrangements in side views, each comprising a hub 2, a rim 4 and spokes 3 provided between the hub and the rim, all of which are parts of a spoke fixing system 100.

A spoke fixing system 100 comprises a spoke 3, a spoke nipple 31 and a holding member 33 or a nipple support. There may further be provided hub nipples 11 for connecting the spoke fixing system 100 with the hub.

Figure 13:
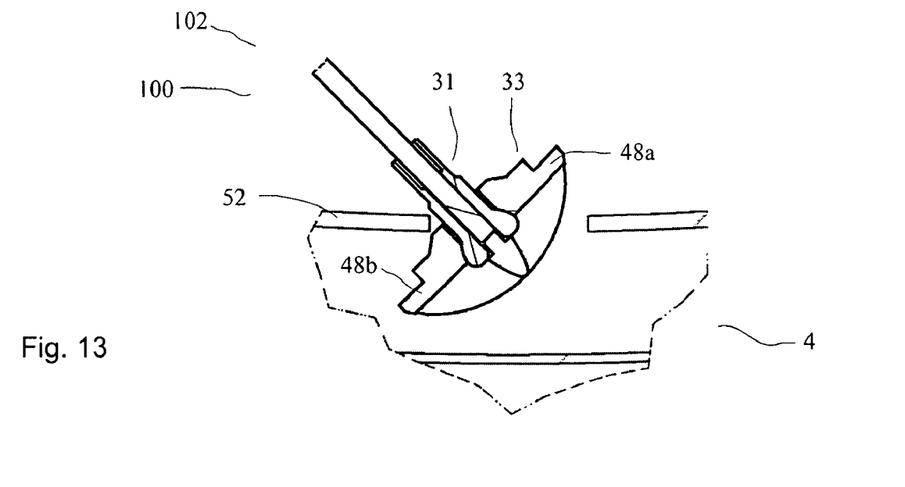
FIG. 13 inserting the spoke nipple into the rim.

For mounting, the spoke fixing system 100 with the holding member 33 slid onto the spoke 3 and the spoke nipple 31 screwed onto the spoke tip is inserted into the spoke hole 50 with the rim flange 48a or 48b first, in the tilted position 102 shown in FIG. 13. Thereafter the spoke 3 is tilted back to assume the position 101 (see FIG. 11), in which the rim flanges 48a or 48b reach behind the rim base 52 and in this way provide a large surface for absorbing and dissipating the forces occurring. The spoke fixing system and mounting the wheel according to the invention will be explained below in more detail with reference to the FIGS. 8 to 17.

The wheel according to the invention allows the use of tubeless tires since passing through the spoke nipples does not require any holes provided in the rim well. Furthermore the configuration according to the invention also offers the quite considerable advantage that the support surface of the spoke nipple 31 on the rim may be enlarged such that the rim wall may be manufactured to be thinner and thus lightweight since the load from the spokes is distributed across a larger surface.

FIG. 1 illustrates a front wheel wherein some of the spokes are positioned radially and some of the spokes 3, more tangentially on the hub. In the rear wheel illustrated in FIG. 2 at the front face in the illustration, the face where the rotor for the sprocket assembly is provided, all the spokes are oriented radially while on the rear face, four spokes extend radially, four more spokes extend tangentially to the right and four spokes to the left from the hub. On the whole this results in a design of an open crow's foot since in the side view the spokes intersect, one to the left, one to the right, and one extending radially.

Figure 3:
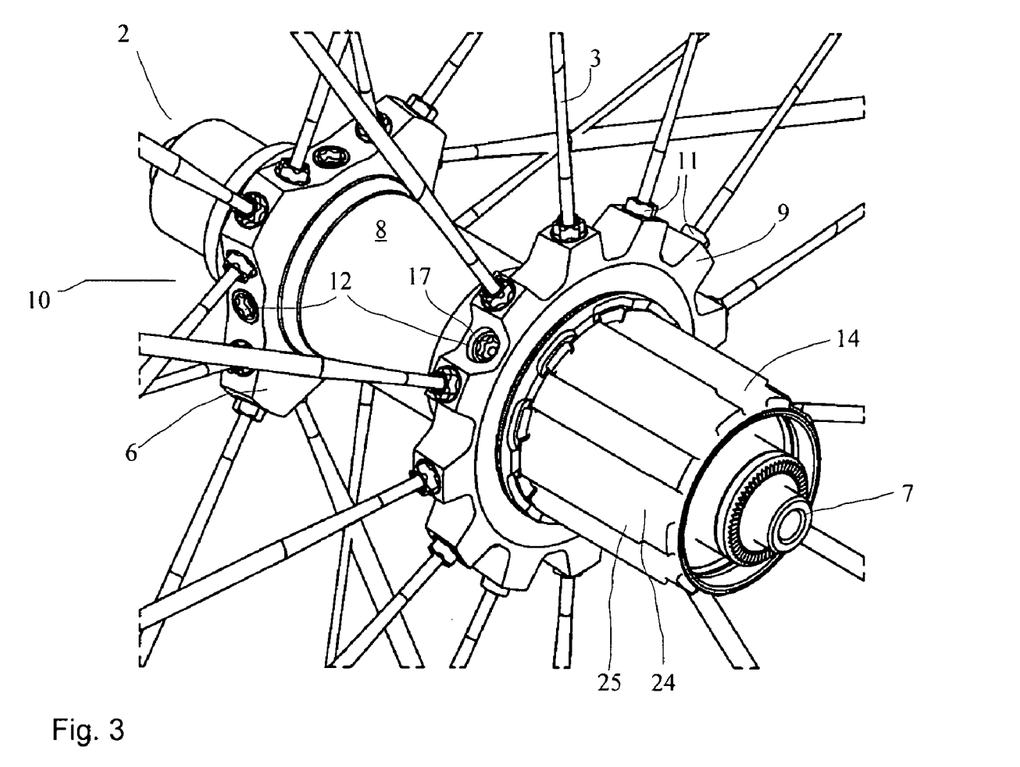
FIG. 3 an inventive rear wheel in a perspective view.

The rear wheel hub 2 illustrated in FIG. 3 comprises a hub axle 7 around which the hub body 10 and the rotor 14 are rotatably mounted. The hub body 10 comprises a hub sleeve 8 and two separate hub flanges 6, 9, which are pushed onto the hub sleeve 8.

To non-rotatably receive the hub flanges 6, 9 on the hub sleeve 8, connecting members 12 are provided which are disposed on the hub flanges 6, 9 and comprise an outer thread to be screwed into an internal thread in the hub flanges.

Figure 7:
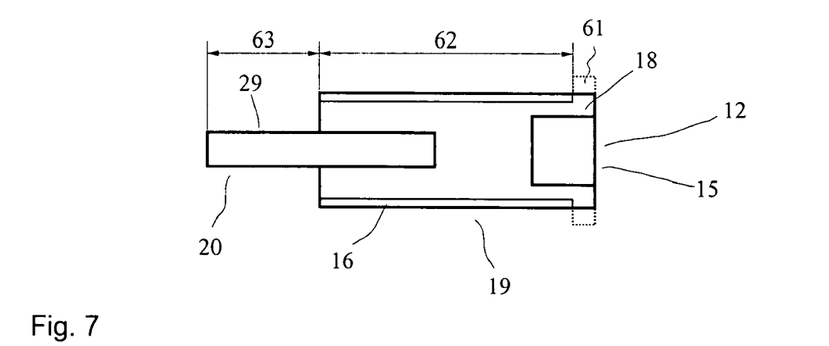
FIG. 7 a schematic side view of a connecting member.

The connecting or attachment components 12 configured as screw parts 15 each comprise a screw head 18, a screw body 19 having an external thread 16, and an inserted pin part 20 which herein is round in cross-section 21 and comprises a smooth outer surface 29 as illustrated in FIG. 7.

The screw part 15 illustrated in FIG. 7 may comprise a radially enlarged head portion 61 as shown by the dotted contours. The larger diameter head portion 61 provides a stopper to limit the depth by which the connecting member 12 can be screwed into the hub flange 6 or 9 so as to prevent the pin part 20 from exerting any force on the bearing seats 55 and 56 disposed within the hub sleeve. The length of the thread portion 62 may be smaller than the thickness of the hub flange at the thread 17 and the length of the pin portion 63 protruding from the screw body 19 may on the whole be smaller than the thickness of the hub sleeve 8 at the positions of the holes 30.

Screwing in too far may be prevented by other means as well, e.g. by way of the depth of the internal thread 17 in the hub flanges 6 and 9.

Figures 4, 5:
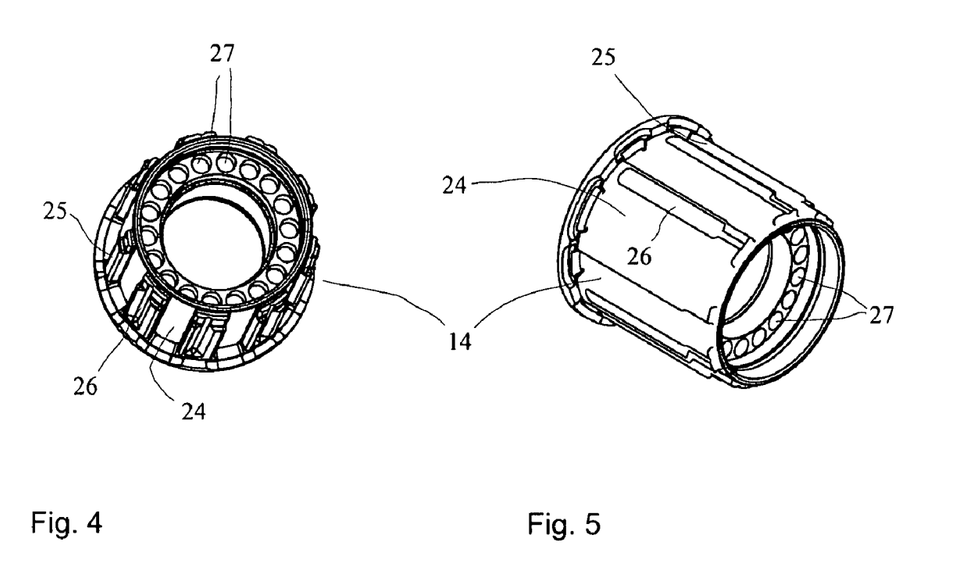
FIG. 4 the rotor of the rear wheel hub according to FIG. 3 in a first perspective view.
FIG. 5 the rotor of the rear wheel hub according to FIG. 3 in a second perspective view.

As illustrated in the FIGS. 4 and 5, the rotor 14 comprises on the external surface 24 axial driving cams 25 provided with notches 26. The axial driving cams 25 allow to non-rotatably position a sprocket assembly on the rotor 14.

By way of the notches 26 the weight of the hub is reduced. In the interior of the rotor 14, bores 27 are provided which also allow a further weight reduction of the rotor without impeding the function.

Figure 6:
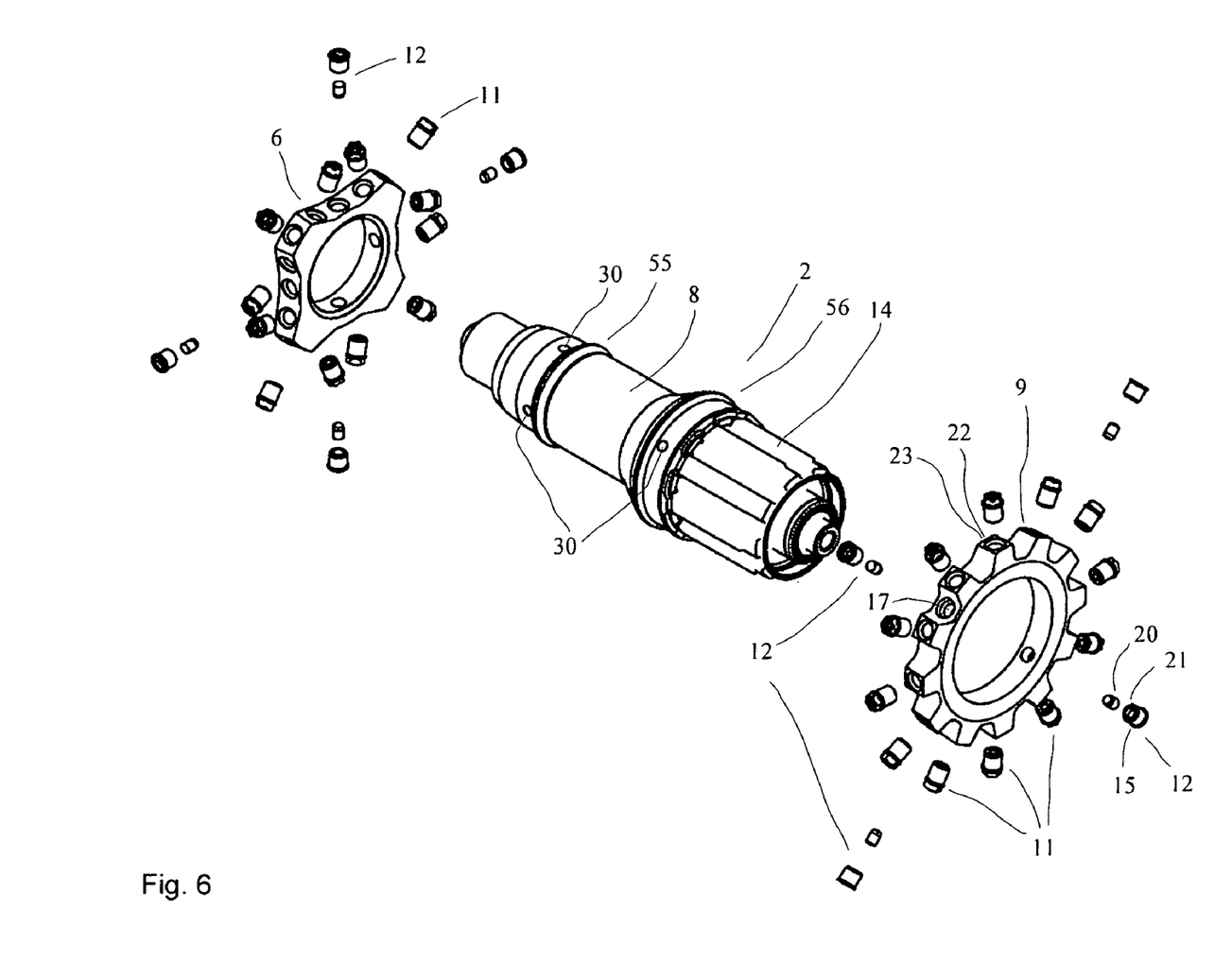
FIG. 6 an exploded perspective view of the rear wheel hub according to FIG. 3.

FIG. 6 illustrates an exploded view of the inventive hub 2, herein configured as a rear wheel hub. The hub sleeve 8 comprises holes 30 herein designed cylindrically and serving to receive the also cylindrical pin parts 20 in an accurate fit so as to achieve an axial fixation of the hub flanges 6, 9 and to secure the hub flanges 6, 9 against rotation relative to the hub sleeve 8. It will in particular be only the pin parts 20 of the connecting members 12 which protrude into the hub sleeve 8 since they are designed for the loads occurring and preferably consist of steel.

In this exemplary embodiment, four connecting members 12 provided as screw parts 15 are provided, which are screwed from radially outwardly into threads 17 of the hub flanges 6, 9 at angular distances of 90 degrees each and whose pin parts 20 protrude radially inwardly into the openings 30 of the hub sleeve 8.

Furthermore the hub nipples 11, which serve to receive threaded ends of the spokes 3, are positioned at the hub flanges 6, 9 in holes 22 configured as threaded holes 23 substantially positioned in a plane substantially transverse to the extension of the hub axle 7.

In preferred configurations the hub nipples 11 may be provided at the same peripheral positions as are the connecting members 12, with the hub nipples 11 then positioned radially farther outwardly such that the connecting members 12 are not visible from outside.

As can clearly be seen in FIG. 6, the modular structure of the inventive hubs 2 is simple on the whole. Since no complicated and heavy axial clamping parts need to be provided, the entire structure may be configured to be very lightweight.

Figure 8:
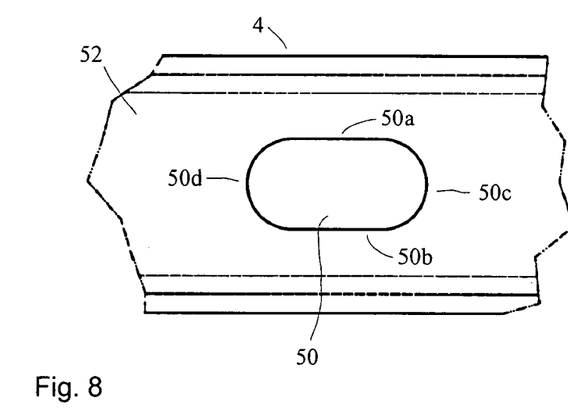
FIG. 8 a top view of a portion of a rim base.

FIG. 8 illustrates a top view of a portion of the rim base 52 of the rim 4 which comprises a rim hole 50. Said rim hole 50 comprises parallel longitudinal edges 50a and 50b, and rounded transverse edges 50c and 50d. The rim hole extends in the peripheral direction of the rim such that the length in the peripheral direction is considerably larger than the width in the axial direction of the rim.

Figure 9:
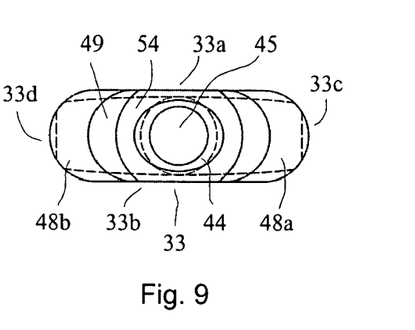
FIG. 9 a top view of a holding member.

The dimensions of the holding member 33 illustrated in FIG. 9 in a top view are matched to the rim hole 50 according to FIG. 8. The external dimensions of the hole cover 49 of the holding member 33 substantially correspond to the external dimensions of the rim hole 50, wherein care is taken for the hole cover 49 to be insertable into the rim hole 50, thus closing the rim hole 50. When closed, the rim flanges 48a and 48b reach behind the rim base 52 so as to be positioned in the hollow portion of the rim, being invisible from outside.

What is visible in the assembled state is the hole cover 49 which follows the rim base 52 substantially seamlessly, and the reinforcing ring 54 provided to reinforce the through bore or the through hole 45 of the holding member 33. In other embodiments it is conceivable to provide the reinforcing ring 54 on the other side of the holding member 33 such that the rim base forms one single, continuous surface through which the spokes protrude radially inwardly.

Both embodiments allow to achieve high sturdiness such that the structural designing may focus on the optical appearance.

The rear face of the holding member 33 (as illustrated in FIG. 9) is, as indicated in dashed lines, provided with the rounded or hemispherical nipple head seat 44 which serves to receive the rounded or hemispherical nipple head 43 of the spoke nipple 31.

Figure 10:
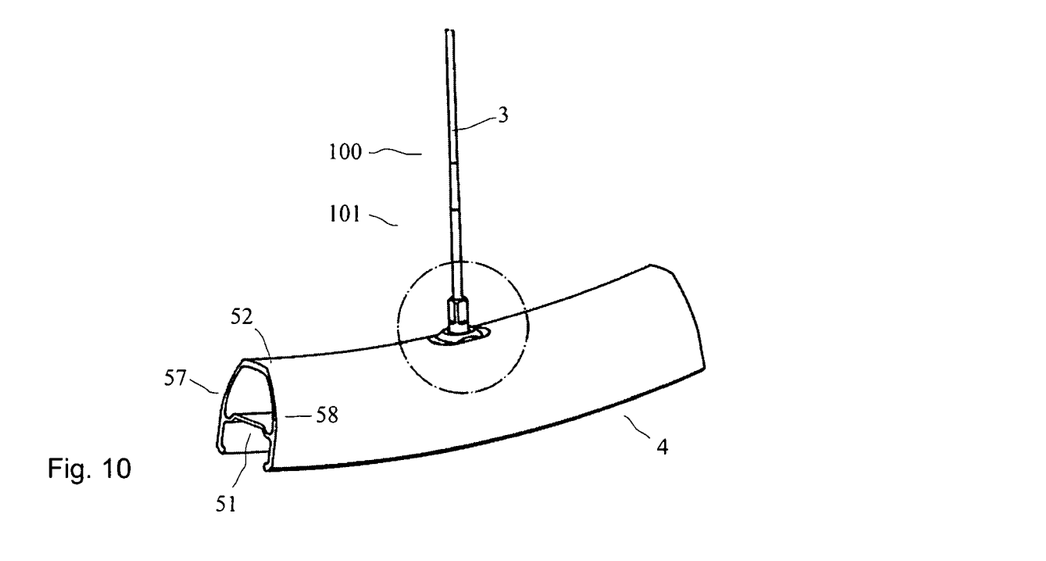
FIG. 10 a perspective view of a portion of a rim.

FIG. 10 illustrates a perspective view of a rim portion 4 comprising a rim hole 50 and a holding member 33 received therein, in which a spoke 3 is held by way of a spoke nipple 31. As can be seen, the holding member 33 with the spoke nipple 31 is disposed in the rim base 52 with the rim flanks 57 and 58 adjacent in the lateral directions. The rim flanks 57 and 58 may protrude beyond the rim well 51 in the radial direction, thus forming rim flanges.

Figure 11:
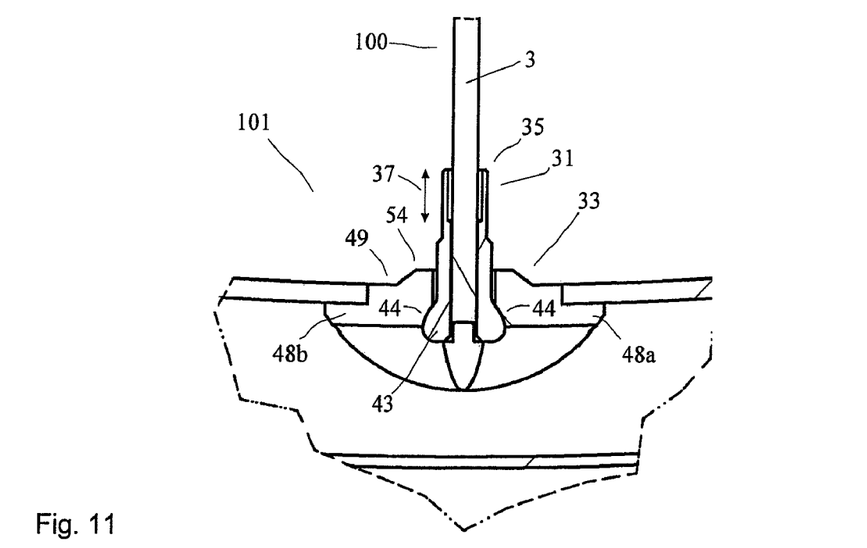
FIG. 11 an enlarged lateral cross-section of the rim-spoke connection.

FIG. 11 shows an enlarged illustration of a lateral cross-section through the rim base 52 wherein the cross-section shapes of the holding member 33 and spoke nipple 31 can be seen.

Figure 12:
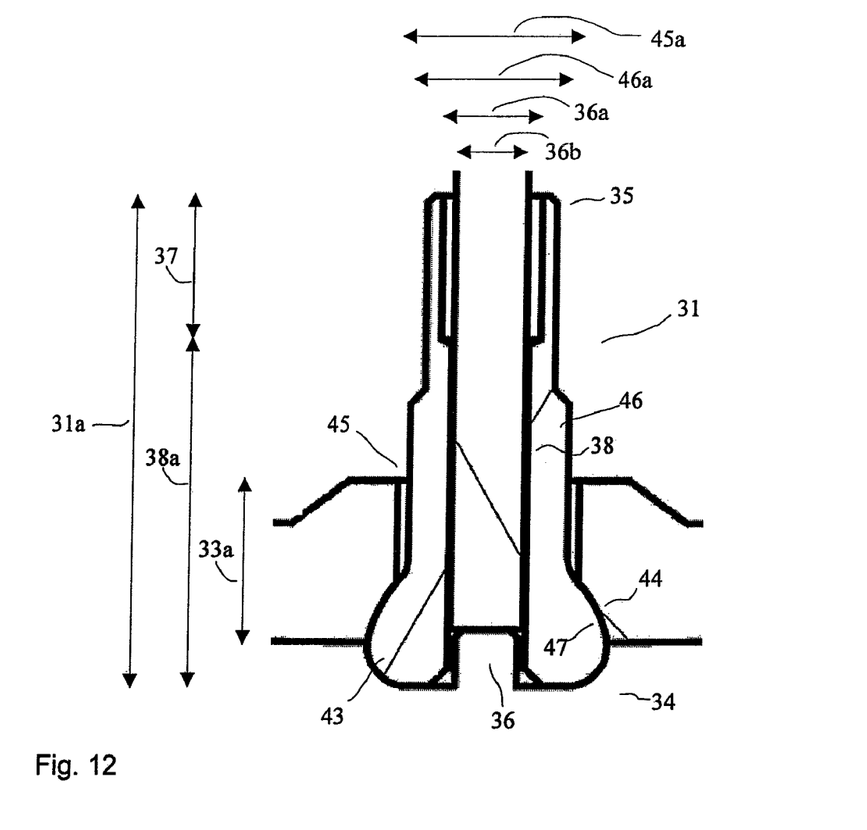
FIG. 12 the spoke nipple at the holding member according to FIG. 11, enlarged still further.

The hole cover 49 forms a continuation of the rim base 52 until the annular reinforcement ring 54 protrudes radially inwardly. At the center of the reinforcement ring 54 the through bore 45 is provided with the rounded nipple head seat 44 disposed at its radially outwardly end with the rounded support surface 47 of the rounded or hemispherical nipple head 43 disposed in said seat. The seat of the spoke nipple 31 in the holding member 33 is shown in FIG. 12 in a still further enlarged illustration. One can recognize that the spoke 3 is screwed with its tip into the thread 38 of the spoke nipple. The thread 38 extends over a length 38a, while the radially inwardly or first end 35 of the spoke nipple 31 is provided with an unthreaded portion in the spoke nipple over a length 37. While the through hole 36 has a diameter 36b, the threadless portion 37 has a diameter 36a which is larger than the diameter 36b.

Furthermore the through hole 45 in the holding member 33 has a diameter 45a that is larger than the outer diameter 46a of the nipple body 46 which extends through the through hole 45.

An interaction of the rounded nipple head seat 44 with the correspondingly rounded support surface 47 of the nipple head 43 and the different diameters of the through hole 45 and the nipple body 46 allow an angularly variable orientation of the spokes. A fixed, non-variable tensioning of the spoke nipple in the holding member as was usual in the prior art can, however, trigger high shearing and buckling forces in the spoke which result in a clearly increased risk of spoke breakage. The configuration according to the invention realizes an optimal spoke orientation due to the possible angular orientation, so as to eliminate hazardous tensions.

The unthreaded portion 37 preferably extends over at least 10% of the length 31a of the spoke nipple, preferably over a range between 20% and 40% of the length of the spoke nipple.

Other embodiments provide for the holding member to comprise support surfaces 48a and 48b not only at the ends 33c and 33d but also on the lateral faces 33a and 33b, wherein in this case the holding surfaces reach beneath the longitudinal edges 50a and 50b. This embodiment allows a full surface support at the spoke hole 50. In such a case, assembly requires a matched geometry and a three-dimensional tilted insertion into the spoke hole.

What is also conceivable and preferred is, to dispose holding surfaces in the shape of support surfaces or rim flanges on three sides to facilitate insertion into the spoke hole.

Figure 14:
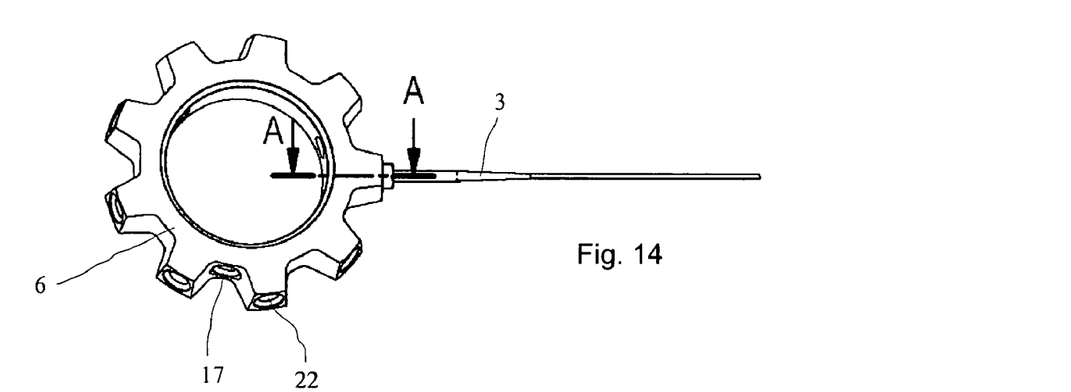
FIG. 14 a perspective view of a hub flange.

FIG. 14 is an enlarged illustration of a separate hub flange 6 into which a hub nipple 11 with a spoke 3 is screwed.

Other configurations may employ hub flanges 6 or 9 which are provided with a receiving means to receive additional components. Over this, for example a disc brake may in particular be positioned at the hub flange. It is likewise possible to provide the hub sleeve 8 with more holes 30 which are preferably also configured cylindrically and serve to receive more, accurately fitted pin parts 20 over which another hub flange can be positioned for carrying e.g. a disc brake. Due to the modular structure the inventive hub is flexible in terms of extensions.

Figure 15:
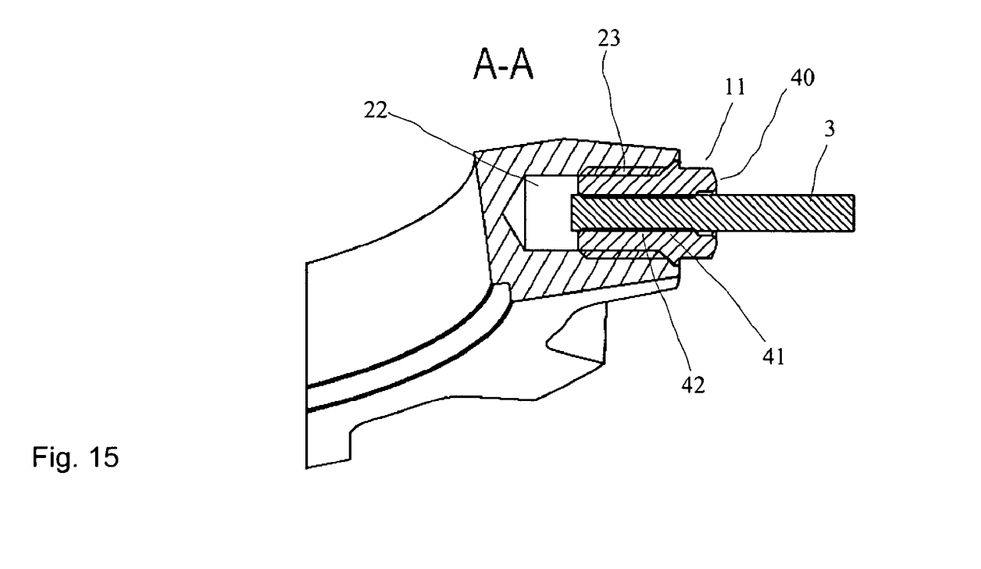
FIG. 15 the enlarged detail A-A from the view of FIG. 10.

FIG. 15 is an enlarged illustration of the section A-A from FIG. 14. The hub nipple 11 comprises a through hole 41 having a thread 42 for the spoke 3 to be screwed in. At the end of the hub nipple facing the spoke, the diameter of the bore 41 is larger than the diameter of the thread 42 over a portion 40.

Figure 16:
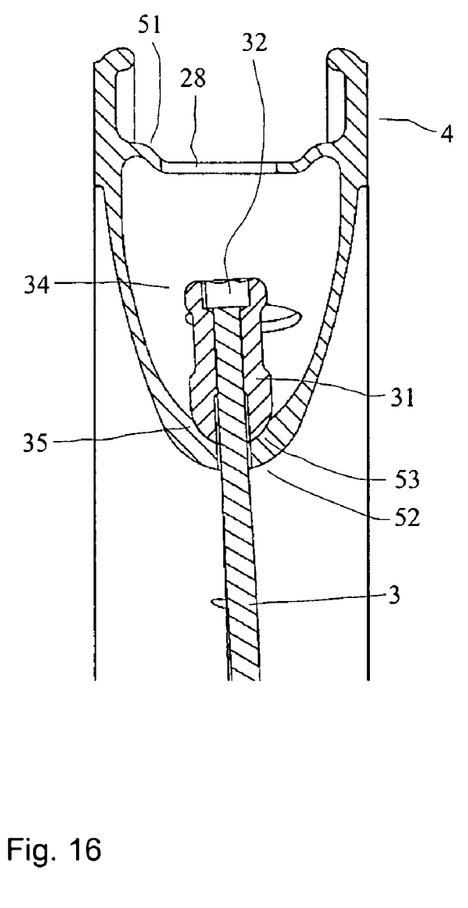
FIG. 16 a sectional, enlarged view of a rim with a spoke nipple.

FIG. 16 illustrates in section another possible configuration of the spoke receiving space of the inventive wheel 1 in the rim 4. In this embodiment the rim well 51 requires holes 28 for the spoke nipples 31 to be inserted through from radially outwardly. At its radially outwardly end 34 the spoke nipple 31 comprises a portion 32 which is matched in shape to a tool and may be configured e.g. as a TORX or a hexagon socket or the like.

The bottom area 53 at which the spoke nipple 31 comes into contact with the rim base 52 of the rim 4, may be rounded off to allow orientating the spoke at an angle relative to the hub with the angle in a specific example being 3° from the vertical plane, but it may be larger or smaller. As illustrated in FIG. 16, a separate inlay part 33 may be provided which comprises a spherical receiving portion for the spoke nipple. The spoke nipple 31 comprises a first end 35 bearing against the rim base or the inlay part 33 and it comprises a second end 34 at which a tool area 32 is provided.

The spoke nipple 31 comprises a through hole 36 which is threaded in its rear portion 38 for the spoke 3 end to be screwed in. At the first end 35 of the spoke nipple 31 a length 37 has a bore larger in diameter than the diameter in the region of the thread 38 such that, as the required spoke tension is applied, the spoke will be prevented from jamming in the spoke nipple due to a local deformation of the spoke nipple 31 in the region of the first end 35 which end 35 of the nipple can easily deform due to the pressing forces.

Figure 17:
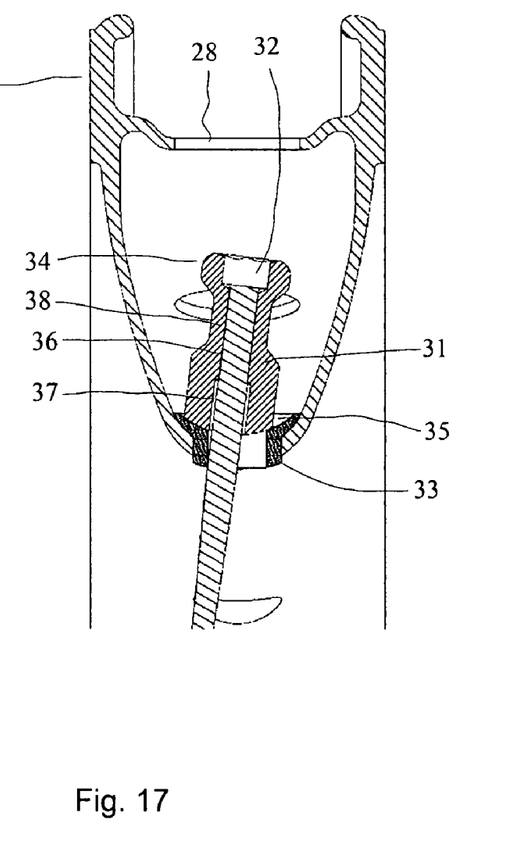
FIG. 17 an sectional, enlarged view of a rim with a spoke nipple with a washer.

In the configurations according to FIGS. 16 and 17 the spoke nipples 31 positioned in the rims are not visible from outside so as to obtain an appealing configuration that is also different from conventional wheels.

Another preferred configuration according to FIG. 17 may provide for the nipple support or the inlay part 33 to be configured asymmetric relative to the longitudinal axis of the nipple and the spoke in that the shape is an oval or e.g. elongated. This also allows the use of rims having no openings 28 such that tubeless tires can again be employed. To insert the spoke nipples 31 into the rim hollow, the hole 28 may be configured e.g. as an elongated hole that is large enough for inserting the nipple covering and the nipple together in a rotated position. After rotating e.g. 90° the nipple covering is held securely, reliably retaining the spoke nipple 31 in the rim.

In this embodiment there is then preferably used a spoke nipple 31 protruding inwardly through the rim base where a tool can grip it. The area which a tool can grip may be configured as a conventional square or in particular an external TORX drive or in any other way.

If these nipple coverings 33 are used, the nipple coverings 33 may be used as custom elements so as to allow an optically appealing configuration of the wheel.

The invention claimed is:

1. A hub for bicycles, comprising:
  a fixed hub axle defining an axis of rotation and a hub body rotatably mounted relative to said fixed hub axle, said hub body comprising, a hub sleeve and two separate hub flanges disposed on said hub sleeve at which spokes may be disposed to connect said hub body with a rim,
  said hub flanges having spoke receiving peripheral surfaces and being spaced apart and independently, removably fastened to said hub sleeve by connecting members,
  each of said connecting members radially extending into one of said hub flanges and configured to engage said hub sleeve for fixing said hub flanges to said hub sleeve in a designated position on said axis of rotation while allowing said hub flanges to move in a radial direction relative to said hub sleeve.

2. The hub according to claim 1, wherein at least one of said connecting members is configured as a screw part and comprises an external thread which can be screwed into an internal thread of a corresponding hole defined by at least one of said hub flanges to connect said at least one hub flange with said hub sleeve.

3. The hub according to claim 2, wherein said screw part comprises a screw head, a screw body, and an unthreaded pin part.

4. The hub according to claim 3, wherein said screw head and said screw body consist of a light metal, and wherein said pin part consists of steel.

5. The hub according to claim 3, wherein said pin part comprises a smooth surface, wherein a cross-section of said pin part is round.

6. The hub according to claim 3, wherein said pin part is inserted into said screw part.

7. The hub according to claim 1, wherein the hub is modular in structure and wherein said hub flanges and said hub sleeve can be replaced individually.

8. The hub according to claim 1, wherein said hub flanges define a plurality of holes.

9. The hub according to claim 1, wherein said hub flanges comprise threaded holes and wherein at least some of said threaded holes are provided to receive hub nipples.

10. The hub according to claim 9, wherein at least one of said threaded holes is positioned substantially perpendicular to said hub axle.

11. The hub according to claim 1, wherein a rotor is provided to receive a sprocket assembly, said rotor including an outer surface and driver cams having axial notches positioned on said outer surface to non-rotatably receive said sprocket assembly.

12. The hub according to claim 11, wherein said rotor comprises axial holes distributed over a peripheral surface of said rotor.

13. The hub according to claim 1, wherein at least one of said connecting members includes an unthreaded pin part that extends into but not through a hole defined by said hub sleeve for accommodating said radial movement.

14. A wheel for a bicycle, comprising:
a rim, a hub and a fixed hub axle defining an axis of rotation, and a hub body rotatably mounted relative to said fixed hub axle;
a plurality of spokes disposed between said hub body and said rim to non-rotatably connect said rim with said hub body, said hub body comprising a hub sleeve and two separate hub flanges disposed on said hub sleeve and wherein said plurality of spokes are received by said hub flanges which connect said hub body with said rim,
wherein said hub flanges are spaced-apart and independently fastened to said hub sleeve by connecting members positioned substantially perpendicular to said hub axle,
each of said connecting members extending radially inwardly to engage a corresponding hole defined by at least one of said hub flanges for fixing said at least one of said hub flanges to said hub sleeve in a designated position on said axis of rotation while allowing said hub flanges to move in a radial direction relative to said hub sleeve.

15. The wheel according to claim 14, wherein said hub sleeve is replaceable without disassembling said spokes by loosening said connecting members.

16. The wheel according to claim 14, wherein said hub flanges comprise threaded holes, at least part of which receive hub nipples.

17. The wheel according to claim 14, wherein said rim comprises two rim flanks, a rim well and a rim base with spoke holes at which said spokes are received, wherein each said spoke hole is provided with a separate holding member, which in a tilted position can be inserted through said spoke hole together with a spoke nipple received at the holding member, while in a reclined position it contacts said rim and is received therein to be tension-proof so as to fix said spoke to said rim,
wherein said spoke holes comprise an elongated shape and in the peripheral direction of the wheel extend to be longer than in the axial direction, wherein said holding member and said spoke nipple are configured so as to allow an angularly variable orientation of said spoke relative to said rim, to which end a rounded nipple head is received in a rounded nipple head seat of said holding member.

18. The hub according to claim 14, wherein at least one of said connecting members includes an unthreaded pin part that extends into but not through a hole defined by said hub sleeve for accommodating said radial movement.

19. A bicycle comprising:
at least one wheel comprising a rim, a hub, a fixed hub axle defining an axis of rotation, a bearing on said hub axle, a hub body rotatably mounted relative to said fixed hub axle, and a plurality of spokes disposed between said hub body and said rim to non-rotatably connect said rim with said hub body,
wherein said hub body comprises a hub sleeve mounted on said bearing and two separate, spaced apart hub flanges disposed on said hub sleeve, wherein said spokes, which connect said hub sleeve with said rim, are received at said hub flanges, wherein said hub flanges of the wheel are independently attached to said hub sleeve by connecting members positioned substantially perpendicular to said hub axle,
each of said connecting members including a pin part that extends into a corresponding hole defined by at least one of said hub flanges for fixing said at least one of said hub flanges to said hub sleeve in a designated position on said axis of rotation while allowing radial movement of said at least one of said hub flanges relative to said hub sleeve such that a radially acting spoke tension does not affect said bearing.

* * * * *